Sept. 6, 1949.  D. O. EGGERT  2,481,297
SPACE HEATING SYSTEM
Filed June 17, 1948
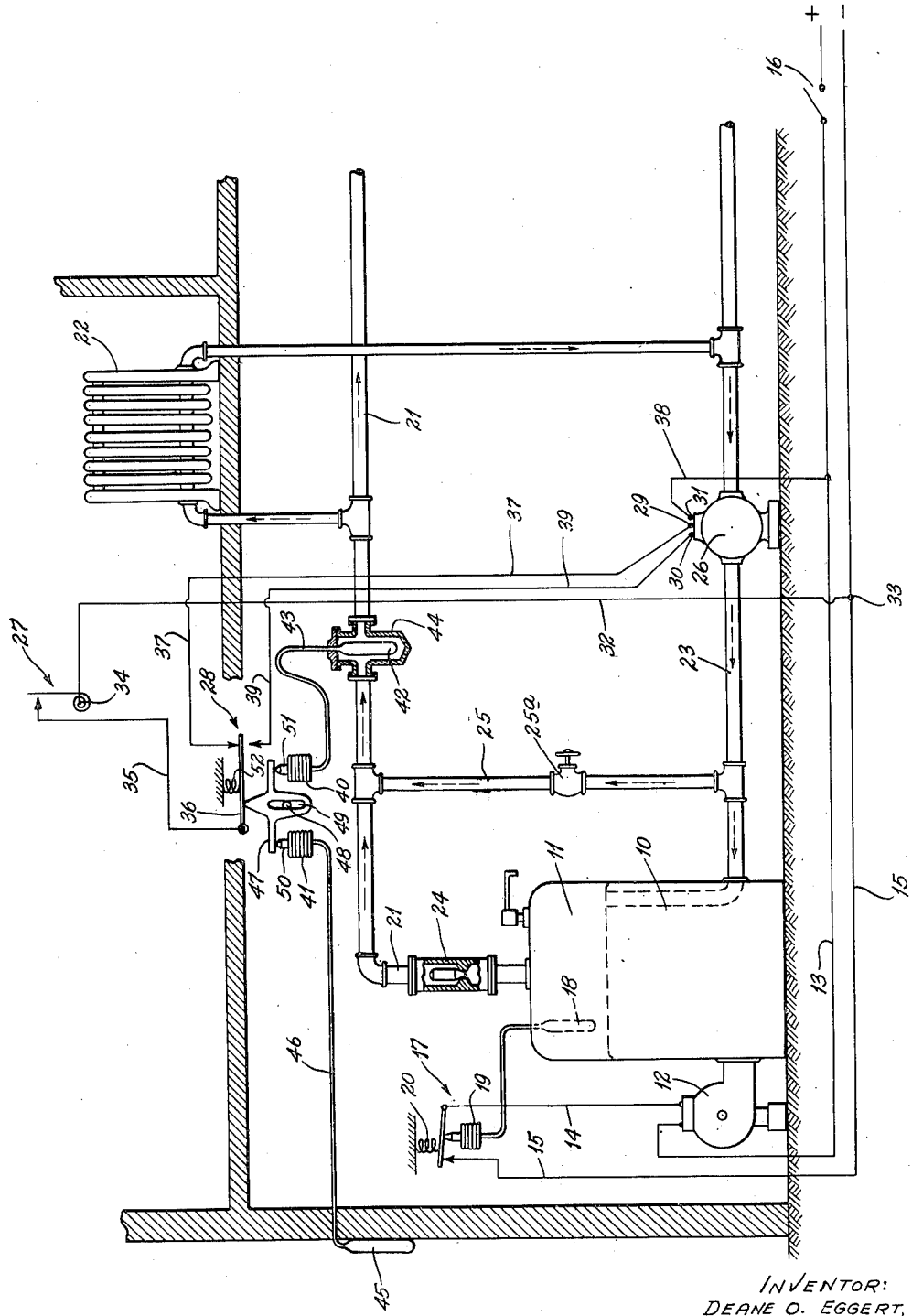
INVENTOR:
DEANE O. EGGERT,
By Charles E. Markham
HIS AGENT.

Patented Sept. 6, 1949

2,481,297

UNITED STATES PATENT OFFICE 2,481,297

SPACE HEATING SYSTEM

Deane O. Eggert, Cleveland, Ohio, assignor to Missouri Automatic Control Corporation, St. Louis, Mo., a corporation of Missouri Application June 17, 1948, Serial No. 33,590

6 Claims. (Cl. 237—8)

This invention relates to space heating systems employing forced circulation of a heating medium, and it more particularly concerns means for automatically heating, mixing, and circulating the heat conveying medium in accordance with the requirements of the space to be heated.

It is an object of the invention to provide in a heating system having a heat producing device, a circulating system for a heat conveying medium including a variable output circulating device, in which varying amounts of the circulating medium are forced into heat exchange relationship with the heat producer depending upon the rate of output of the circulating device, and in which a reserve of heated medium is constantly maintained for immediate introduction into the circulating system.

Another object is the provision of automatic control means for the circulating device including temperature responsive switching means responsive to a drop in temperature of the space to be heated to cause low output operation of the circulator, and temperature responsive switching means responsive to a drop in the sum of the temperatures of the medium in the circulating system and the temperature of the outdoor air to cause higher output operation of the circulator.

A further object is to provide in a heating system having a heat producing device, a circulating system having a variable output circulating device and an adjustable restriction therein, and having conduit means around the restriction including surfaces in heat exchange relationship with the heat producer and a normally closed yieldable valve for controlling the flow therethru, whereby greater amounts of the medium are forced into heat exchange relationship with the heat producer and greater amounts of heated medium are forced into the circulating system as the output of the circulating device is increased.

A further object is to provide in a heating system as above, reservoir means associated with the heat producer for reserving a quantity of the heating medium, and control means responsive to temperature changes in the reservoir to start or stop operation of the heat producer so as to maintain a predetermined temperature of the reserve medium.

Other objects and advantages will appear from the following detailed description when read in connection with the accompanying drawing.

In the drawing the single figure is a schematic illustration of one form of the invention arranged to employ water as a heat conveying medium.

Referring to the drawing in detail, the numeral 10 indicates a boiler furnace having a reservoir 11 in which a reserve of heated water may be maintained. The furnace includes an electrically operated burner device 12. An energizing circuit for burner 12 is provided which includes the leads 13, 14 and 15. The leads 13 and 15 being connected to a source of energy, not indicated, and which connection is under the control of a manual switch 16. Interposed in the energizing circuit between the leads 14 and 15 is a temperature responsive switching device generally indicated at 17 including a temperature sensitive fluid filled bulb 18 in the reservoir 11, and an expansible element 19 connected thereto for actuation of the switch. The switch 17 opens to stop operation of the burner 12 when the temperature of the water in reservoir 11 reaches a predetermined point and closes under the pressure of a spring 20 as the water temperature drops below a predetermined point.

The circulating system for the heating medium includes a conduit 21 leading from the reservoir 11 to radiators 22 or other heat exchange devices located in the spaces to be heated, and a return line 23 leading from the radiators to the reservoir 11. In the conduit 21 at the outlet of the reservoir 11 is a weighted valve generally indicated at 24 which operates to yieldably restrict the flow of water therethru. Connected across the supply conduit 21 and return conduit 23 is a by-pass conduit 25 having an adjustable non-yielding valve 25a therein. In the return line 23 anterior to its connection with the by-pass 25 is a two speed electrically operated circulating pump 26.

The operation of the circulator 26 is controlled jointly by a space thermostat generally indicated at 27, and an indoor-outdoor type temperature sensitive switching device generally indicated at 28. The two speed circulating device is provided with terminals 29, 30 and 31 and field connections are so arranged that when terminals 29 and 31 are connected across a source of energy, the circulating device will operate at low speed or low output and when terminals 30 and 31 are connected across a source of energy, the device will operate at high speed or high output.

The circuit for low output operation of the circulator includes a lead 32 connected to the line 15 at 33 and to one side of the space thermostat 27 at 34, a lead 35 connecting the other side of space thermostat 27 with a double throw switch blade 36 of the switching device 28, the switch blade 36, a lead 37 to terminal 29, and a lead 38 from terminal 31 to line 13. The circuit for high output operation of the circulator includes the lead 32, the switch 27, the lead 35, switch blade 36, a lead 39, connected to the terminal 30, and the common lead 38 from terminal 31 to the line 13.

The temperature responsive switching device 28 includes a pair of expansible elements 40 and 41. Element 40 communicates with a fluid filled temperature sensitive bulb 42 by means of a capillary tube 43. A well 44 in the supply line 21 at a point posterior to the junction of by-pass 25 is provided for insertion of the bulb 42. Expansible element 41 communicates with a fluid filled temperature sensitive bulb 45 by means of a capillary tube 46. The bulb 45 is located outside of the building so as to be sensitive to outdoor air temperature.

Switch 28 further includes an equalizing or averaging lever 47 pivoted at 48 and provided with a vertically elongated slot 49. The expansible elements 40 and 41 include means 50 and 51 for contacting the lever 47 on opposite sides of the pivot 48. The lever 47 bears against the switch blade 36. A return spring 52 is provided which urges the switch blade 36 downward.

Operation

When the temperature of the heated space drops below that selected to be maintained, the space thermostat 27 will close, and if the switch blade 36 is in contact with the lead 37 as shown, a circuit for the low output operation of the circulating pump will be completed. If the valve 25 has been opened sufficiently, substantially all the circulating medium will by-pass the furnace. Under conditions of low heat requirement, the temperature of the medium in the circulating system may be sufficiently high to supply the required heat without the introduction into the system of any higher temperature medium. The temperature sensitive switch 28 will however, determine whether or not the temperature of the medium is sufficient to supply the demand.

If the temperature of the medium is less than that which has been predetermined to be correct to hold the selected space temperature for the instant outdoor air temperature, the expansible element 40 will have contracted and the switch blade 36 will have swung down to connect with the lead 39 thereby to complete a circuit for the high output operation of the circulator. When this occurs, the by-pass will be insufficient to handle the increased output of the circulator and the flow valve 24 will be forced open to admit a quantity of heated water into the system. As soon as the temperature of the water in the circulating system has been raised sufficiently by the mixing of heated water with the recirculating water, the element 40 of switch 28 will be expanded to break the high output circuit and to remake a low output energizing circuit whereafter the medium will continue to circulate until the space thermostat has been satisfied.

Decreasing outdoor air temperature will cause the expansible element 41 to contract, thus lowering the averaging lever 47 and requiring a higher mixture temperature to break the high output circuit, which of course results in a higher mixture temperature being maintained. The operation of the indoor-outdoor type control diagrammatically illustrated at 28 being well known and understood by those skilled in the art. The temperature of the water in the reservoir 11 is maintained substantially constant as predetermined by the adjustment or calibration of the switching device 17.

The foregoing description and accompanying drawing is intended to be illustrative, and not limiting, the scope of the invention being set forth in the appended claims.

I claim:

1. In a space heating system in combination, means providing a reservoir of heat conveying medium at substantially constant temperature, said reservoir having an inlet and an outlet, a system for circulating the medium between said reservoir and the space to be heated comprising a supply line connected to said reservoir outlet, a return line connected to said inlet, a normally closed yieldable valve for controlling said outlet, conduit means connecting said supply and return lines for by-passing said reservoir, a variable output circulating device, and a control for said circulating device including means responsive to the temperature of the space to be heated for starting and stopping said circulating device, and means responsive to a change in the sum of the temperatures of the outdoor air and the medium delivered to the space for varying the output of said circulating device.

2. In a space heating system in combination, means providing a reservoir of heat conveying medium at substantially constant temperature, a circulating system for circulating the medium between said reservoir and the space to be heated, a yieldable valve for restricting the flow through said reservoir, a by-pass around said reservoir, a variable output circulating device, and a control for said circulating device including a space thermostat for controlling the starting and stopping of said circulating device, and means responsive to a change in the sum of the temperatures of the outdoor air and the medium delivered to the space for varying the output of said circulating device.

3. In a space heating system in combination, a heat producer, a circulating system for a heat conveying medium including a portion thereof in heat exchange relationship with said heat producer, a by-pass around said portion, a yieldable valve for restricting the flow through said portion, a variable output circulating device for forced circulation of the medium through said system, a control for said circulating device responsive to a change in the sum of the temperatures of the outdoor air and the medium being delivered to the space for varying the output of said circulating device, and an overriding control responsive to the temperature of the space to be heated for starting and stopping operation of said circulating device.

4. In a space heating system in combination, a furnace having a reservoir of heat conveying medium, control means responsive to the temperature of the medium in said reservoir for controlling the operation of said furnace so as to maintain the temperature of the medium in said reservoir substantially as predetermined, an inlet and an outlet for said reservoir, a system for circulating the medium between said reservoir and the space to be heated including a supply line connected to said reservoir outlet, and a return line connected to said reservoir inlet, a normally closed yieldable valve in said outlet, a by-pass connecting said supply and return lines, a variable output circulating device for forced circulation of the medium through the system, a control for said circulating device responsive to a change in the sum of the temperatures of the outdoor air and the medium delivered to the space for varying the output of said circulating device, and an overriding control responsive to the temperature of the space to be heated for starting and stopping operation of said circulating device.

5. In a space heating system in combination, a heat producer, a circulating system for a heat conveying medium including a portion thereof in heat exchange relationship with said heat producer, an adjustable by-pass around said portion, a yieldable valve for restricting the flow through said portion, means responsive to the temperature of the medium in said portion for controlling the operation of said furnace so as to maintain the temperature of the medium in said portion substantially as predetermined, variable output circulating device for forcing circulation of the medium through the system, a control for said circulating device responsive to the temperature of the medium being delivered to the space for varying the output of said device, and an overriding control responsive to the temperature of the space to be heated for starting and stopping said circulating device.

6. In a space heating system in combination, means providing a reservoir of heat conveying medium, a circulating system for circulating the medium between said reservoir and the space to be heated, a yieldable valve for restricting the flow through said reservoir, a variable by-pass around said reservoir, a variable output circulating device for forced circulation of the medium through said system, a control for said circulating device responsive to the temperature of the outdoor air for varying its output, and a control responsive to the temperature of the space to be heated for starting and stopping said circulating device.

DEANE O. EGGERT.

REFERENCES CITED

The following references are of record in the file of this patent:

UNITED STATES PATENTS

| Number | Name | Date |
|---|---|---|
| 2,181,480 | Gillett et al. | Nov. 28, 1939 |
| 2,211,573 | McGrath | Aug. 13, 1940 |
| 2,262,194 | Newton | Nov. 11, 1941 |